Figure 1:
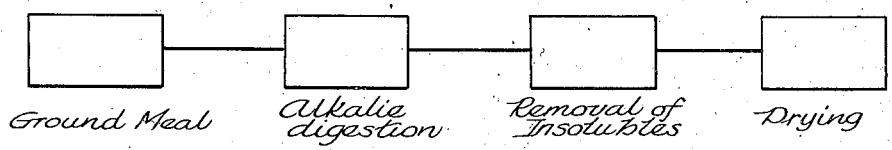

Feb. 25, 1941.    J. M. KNISELEY ET AL    2,233,213
FIBER-FREE PROTEINOUS ADHESIVE FROM SEED MATERIALS
Filed Nov. 18, 1938

Inventors
John M. Kniseley
Jean I. Campbell
By Cushman Darby & Cushman
Attorneys Patented Feb. 25, 1941

2,233,213

UNITED STATES PATENT OFFICE 2,233,213

FIBER-FREE PROTEINOUS ADHESIVE FROM SEED MATERIALS

John M. Kniseley and Jean I. Campbell, Seattle, Wash., assignors to I. F. Laucks, Inc., Seattle, Wash., a corporation of Washington Application November 18, 1938, Serial No. 241,280

4 Claims. (Cl. 134—23.8)

The present invention relates to the manufacture and use of new proteinous adhesives derived from seeds and characterized by a unique combination of good properties and low cost with resulting suitability for wide use in coating, sizing, and gluing paper, textiles, wood, and the like. A feature contributing to both cheapness and security of supply is that these new adhesives may be obtained from oilseed residues from soybean, cottonseed, peanut, tungnut, linseed, castorbean and the like which are both rich in protein and also abundantly available as by-product cake, meal, or flour from the pressing or solvent treatment of the seeds for extracting the oil. An important object is to treat this cheap starting material by a particularly economical and efficient process and with so little denaturing, that the final product is still cheap and yet has the right properties.

The new method of obtaining this proteinous adhesive is, however, of broad application and is not confined to the treatment of oilseed residues but may also be applied to obtain valuable proteinous adhesives from other seeds and seed products such for instance as the various cereals and their derived flours and meals. The particular source selected will, of course, be determined by the characteristics of the source material, the properties required in the final product and the economic considerations.

An example of one of the most important uses for such an adhesive is to replace casein, a diary by-product precipitated protein, now the main papercoating adhesive. The expanding consumption of over two thousand tons a month of casein for papercoating far exceeds domestic supply necessitating heavy importation, a condition tending to cause wide and often violent price fluctuations with occasional serious scarcity. This unsatisfactory supply situation, involving at times a thread to productions and a brake on expansion, has existed without remedy for some years. Casein is also somewhat objectionable because of technical difficulties including lack of uniformity, tendency to foam, objectionable odor, and for some purposes an undesirably high water requirement. The paper industry has naturally sought a cheaper and better material derived from a more stable source.

Many attempts have been made to replace casein with soybean flour, one of the cheapest of proteinous materials, as has been successfully done in the case of plywood glues, but as regards coating uses, success has not been obtained with soybean flour except for a few types of coated wallpaper having a dull surface. The main technical obstacles preventing a similar successful substitution in papercoating have been the need for objectionably high alkalinity to obtain sufficient adhesion, objectionably high water requirement, particularly in the important field of gloss coating, and the inability to avoid brushmarks. Most coated papers are of the gloss type requiring such a smooth, unblemished, shiny surface that any brush-marks at all are fatal. It will be understood that normally all coatings are smoothed out after application by a series of oscillating brushes and, while the brush-hairs mark the surface momentarily, the marks immediately disappear if the coating mixture has proper flowing quality. With soybean flour as the adhesive the brush-marks persist. Much effort has been expended on the attempt to eliminate the trouble by improved dry milling of the flour with careful bolting out of the more fibrous elements and also by ultra fine grinding. Other attempts have been by adding various thinning, flow promoting or solvent agents to the wet coating mix, but none of these efforts have eliminated the brush-marks.

Casein, a relatively pure milk protein extracted by a precipitation process leaves no brush-marks, neither does the other extracted and hence relatively pure protein material, animal glue, which is still used to some extent. Both these animal proteins have, moreover, a relatively high adhesive strength which in general seems to characterize the animal proteins as compared to the industrial types of vegetable proteins. The adhesive strength of the latter is on a somewhat lower level, although adequate for most uses. Casein and animal glue, although strictly only technically pure proteins, analyze eighty per cent and upwards of actual protein, while soybean flour usually only analyzes between forty-three and forty-eight per cent. The natural assumption that the constituent protein in soybean flour is the sole useful adhesive element has lead to the belief held prior to this invention, that only an equally protein-rich soybean extracted product can replace casein with commercially equivalent adhesive properties and the essential freedom from brush-marks. Confirmation of this view as to the necessity for a soybean product being of extremely high protein content to be effective, also seemed to be found in the fact that a high grade eighty-five per cent protein content acid precipitated soybean adhesive which is free from the brush-mark difficulty and suitable for papercoating has recently become available, but the unfavorable factors of low yield and extensive processing add so much to the cost as to prevent any considerable saving over casein. This is natural since in a precipitation process a thirty-nine per cent yield is all that can be expected from an original flour containing only about forty-three per cent protein while the expense of extraction, acid precipitation, and recovery of the product in dry form must also be added.

Thus casein is unsatisfactory mainly because of uncertainty of supply and resulting high costs; extracted acid precipitated soybean protein although it has some very suitable qualities including freedom from brush-marks, fails to make any important saving, while the cheap soybean flour, although in the advantageous position of being backed up by adequate supply nevertheless, in its present form, is ruled out by the brush-mark trouble. Consequently, the success of the present invention in obtaining a less highly refined but suitable material from soybean flour in particular, as well as from many other materials, and at very moderate cost is an important advance.

Our invention depends on two important discoveries. In the first place we find that it is by no means necessary to incur the serious direct and indirect expense of producing a highly refined extracted acid-precipitated soybean protein in order to transform soybean flour into an effective paper-coating adhesive. Thus, this aspect of our discovery runs counter to the previously held theory that all or nearly all the non-protein material in the soybean flour is objectionable. On the contrary, we have found that the troubles connected with using soybean flour, particulary as a paper-coating adhesive, are actually all derived from a relatively small component, namely the fibrous constituent, and, furthermore, we have found an inexpensive and effective method of removing the troublesome component which avoids the cost of the acid precipitation step, as well as the consequent objectionable denaturing effect due to the action of the acid on the protein. After this has been done by our method, we find that both the proteinous and non-proteinous remainder, are alike useful. We thus avoid both the former handicap of low yield factor and precipitation costs and are able to obtain a satisfactory new product which is also inexpensive. There are also important incidental advantages, among these being the wide applicability of the method to proteinous seed materials in general.

By microscopic and other studies of paper-coating adhesive mixtures made from unprocessed soybean flour, we have proved that the main cause of brush-marks is the presence in the flour of an insoluble cellulosic crude fiber element which appears to form the skeleton or framework of the cells, particularly those cells which form the outer layers of the seed. The presence of crude fiber is characteristic of all seeds. Although this material is most plentiful in the outer layers, it is also present throughout the inner portion so that it is impossible to entirely remove it from the flour by milling methods, such as would reject the outer parts and retain the inner parts which are also richest in protein. This cellulosic material swells greatly, but does not dissolve in an alkaline medium and it is these greatly swollen fragments of cell structure which may be called crude fiber, which cause the brush-marks. At any rate, when we remove such fibrous constituents, brush-marks disappear. By weight, we find these insoluble cellulosic fragments form only a very minor part of the total weight of the flour, not usually exceeding between one-tenth and one-fifth of the total. We find that when all the alkali-soluble portions have been dissolved in an aqueous alkaline medium, with the alkalinity controlled between certain limits, the cellulosic parts become greatly swollen and are then easily rejected by settling or centrifuging or both, whereupon the entire remainder which forms 80 to 90% of the flour is then useful as a papercoating adhesive provided it is recovered in a substantially undenatured form.

In the second place, we have discovered that ammonia and equivalent volatile alkalies have a special combination of properties which make it possible to cheaply remove the troublesome component with a commercially practical yield of final dry product which has the essential characteristic of being free from any substantial denaturing. It has been well-known that vegetable proteins may be dissolved and under laboratory conditions very completely extracted by treatment with various alkalies, but when such a product made according to methods hitherto known is dried down, we find the resulting dry product to be seriously denatured and thereby rendered unfit for general use as an adhesive. We have discovered a general rule that under commercial conditions a substantially complete extraction is not obtained below a certain minimum limit of alkalinity which is approximately pH 9 and we have also found that denaturing with loss or objectionable modification of adhesive properties occurs if at any stage in the process the product is for any appreciable length of time subjected to a pH exceeding 11.25. As far as a wet extraction process is concerned, we find it is readily possible to obtain satisfactory results between these limits with the common alkaline reagents such as, for example, caustic soda, caustic potash, lime and ammonia. But with all these reagents, with the exception of ammonia, even though the original alkalinity is kept between the aforementioned limits, in the process of drying these fixed alkalies being non-volatile, tend to concentrate, and, consequently, the critical limit of pH mentioned above which is approximately pH 11.25 is passed and during the later stages of the drying, the material is thus unavoidably treated at a high alkalinity with inevitable denaturing. We find that with ammonia, which is a volatile alkali or with an equivalent, this difficulty is automatically avoided. With ammonia, also, the wet extraction can be conducted with a sufficient concentration without undue expense so as to secure a substantially complete extraction, while the volatile characteristic of the reagent automatically protects the material from denaturing, provided the pH of the wet extraction is kept below the critical value. By the application of this procedure we have discovered that it is possible to remove the objectionable fibrous element from such a material as soybean flour and obtain the remainder including the proteinous material in a dry undenatured form. This method produces a satisfactory adhesive base and is widely applicable to seed materials in general.

Equivalents of ammonia for the purposes of the present invention are the lower members of the primary aliphatic amine series including mono-methyl, ethyl, propyl and iso-propyl amines. All of these compounds also have the essential combination of volatility, alkalinity and water solubility. At present, however, their cost is excessive and for this reason ammonia is preferred.

Only three processing steps are required in producing a dried product: first, the treatment or digestion of the seed flour or meal for a suitable time in an aqueous suspension in dilute ammonia to dissolve, disperse, or suspend out all or substantially all of the useful material, while the alkalinity of the solution is regulated between limits which are at the same time high enough to effect a reasonably complete extraction and also low enough to avoid any substantial denaturing; second, removal of the undissolved minor fraction of objectionable brush-mark forming fibrous component; and, third, recovery of the remaining solids by low temperature drying, preferably spray drying, under conditions which are also regulated so as to avoid denaturing. Thus, we recover substantially all the useful components free from undesirable elements and in substantially undenatured condition.

By "undissolved minor fraction" we mean that portion of the liquor consisting of discrete particles or clots which are readily visible either to the naked eye or under the microscope.

This improved treatment not only has a new simplicity, particularly in entirely eliminating the step of acid-precipitation, but the product also is characterized by a novel composition and properties and is substantially undenatured as well as inexpensive. An important feature of our process is that it avoids all the three commonest forms of denaturing; namely, the acid denaturing inevitable in processes employing the step of precipitating dissolved protein by an acid treatment, also the denaturing due to excessive alkalinity, and, lastly, the denaturing due to severe heat treatment.

For the purpose of the present description and appended claims, we define denaturing of a proteinous material as any change in molecular structure or physical properties which causes a substantial reduction in the adhesive properties of the material. Various evidences of such change are well recognized in the adhesive art, such as for example decreased solubility in mild alkalies, increase in the amount of alkali required to produce a dispersion of spreadable consistency, increased water requirement, decreased ability to whip up into a froth and, of course, decreased adhesive strength.

To the accomplishment of the foregoing and related ends, the invention, then, comprises the features hereinafter fully described, and particularly pointed out in the claims, the following description setting forth in detail certain illustrative embodiment of the invention, these being indicative however, of but a few of the various ways in which the principle of the invention may be employed.

Figure 2:
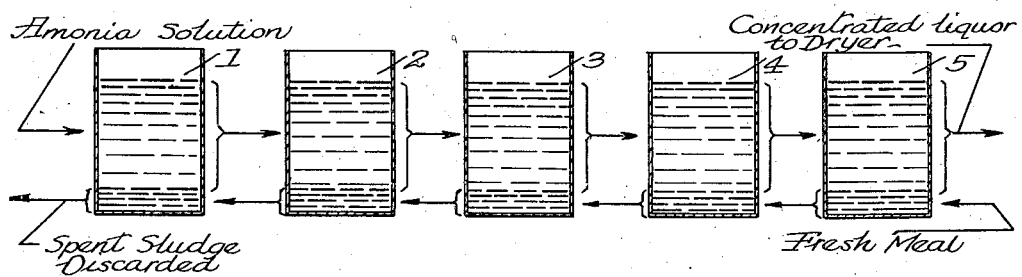

The accompanying drawing is a diagrammatic illustration of the preferred procedure and referring thereto, Figure 1 indicates a flow sheet showing the general operations of the process, and Figure 2 is a detail view illustrating the counter-current digestion and extraction step.

EXAMPLE 1

The following description illustrates one commercial operation of the invention, in this case using a countercurrent batch-process extraction applied to soybean meal, with recovery of the useful product in finely divided dry form by spray drying. The apparatus used included a series of tanks, in this instance and preferably, at least five in number, each equipped for agitation and decanting. A centrifuge was provided for removing from the extracted liquor a small amount of undissolved residue which might otherwise pass over during decanting. Spray drying equipment was employed provided with a high pressure nozzle system for injecting the spray, and means for continuous removal of the powder from the drying chamber and cooling to room temperature in order to eliminate denaturing the product by excessive heating.

The operations of dissolving the desired solids from the soybean meal and separating out the insoluble objectionable fraction in the form of a sludge were both performed in the extraction tanks. The soybean meal in this instance contained 44.6% of protein and was obtained by grinding pressed cake left over from pressing the oil out of the beans under conditions which did not heat the cake excessively so that the constituent protein was not initially denatured. In this and the subsequent examples as well as in the appended claims, the term "meal" is used broadly as embracing either flour or coarser material, since we have found that the exact particle size is not essential to our process. For convenience in mixing, a degree of fineness of the meal such as would cause lumps was avoided. A product fine enough so that it would all pass through a 20 mesh screen was found satisfactory. The meal was agitated in a dilute aqueous solution of ammonia containing about ten (10) parts of water to one (1) part of soybean meal and about eight (8%) per cent of concentrated aqua ammonia in relation to the weight of the meal.

The ammonia content was adjusted at about pH 10 so as to be well on the alkaline side, i. e. between the limits of pH 9 and 11.25. The range below the lower limit we find is undesirable because of the tendency to incompletely extract the soluble elements as well as to retard and delay extraction, while the range above the upper limit must be avoided because of the denaturing effect. This upper limit of pH 11.25 we find is critical and any treatment at any stage at a higher alkalinity will produce serious denaturing. Thus, it will be seen that we have discovered a range of pH capable of completely extracting the desirable elements rapidly enough to be commercially desirable and yet doing so without reaching such high alkalinity as would injuriously denature our product. These considerations of high yield and avoidance of objectionable denaturing are essential.

It should be borne in mind that the present invention of which the above procedure is one example, embodies a process to be distinguished from conventional operations in that here not only must substantially all of the soluble protein be extracted, but, in addition, other non-proteinous materials heretofore regarded as objectionable must likewise be simultaneously extracted. It will now be seen that in our process the discarded material is much less than in conventional operations.

In this instance the system was operated at room temperature, and in order to inhibit bacterial decomposition during the digesting stages, one per cent (1%) of pine oil in proportion to the weight of the soybean meal was added. We have found pine oil very efficient for this purpose, but, of course, other inhibitors of decomposition as for example water-soluble phenolic substitution compounds or mercuric compounds may be substituted.

The process may also be operated at low temperature, e. g., from room temperature down to the freezing point of the solution without substantial loss of efficiency. At low temperatures, no preservative is needed since low temperature inhibits decomposition without interfering with the extraction. It is to be understood that to a considerable extent, time and temperature are variable. Furthermore, while an increase above room temperature appreciably shortens the time required to complete the extraction, it also tends to cause denaturing as well as to cause bacterial decomposition to set in at an earlier stage. We have found in practise that 125° F. is approximately the maximum safe temperature for the extraction. At this temperature, a reasonably complete extraction may be effected in about six hours without either appreciable denaturing or bacterial decomposition. At room temperature, the extraction ordinarily requires about sixteen hours for completion to a commercially satisfactory recovery of useful material and for convenience, with a countercurrent system, a 24 hour extraction, changing and renewal of the contents of the various tanks, is a convenient operating cycle which gives excellent results. The considerations of time and temperature are subordinate to the control of the alkalinity of the digesting solution whereby we obtained optimum extraction of both the soluble proteins and non-proteinous matter, with substantially complete or maximum removal of the objectionable fibrous component, and the proteins are extracted in a substantially undenatured state.

The operation of the countercurrent extraction system was carried out in the tanks according to the usual method for a batch process by operating so that the solution from the first tank was used as the extraction liquor for the next and so on, so that the liquor from the last tank was the most concentrated solution and the meal that was most nearly exhausted received the fresh and most active ammonia solution to remove the last residue of desirable material and leave behind only a completely insoluble sludge which can be either discarded or dried and sold as a by-product.

The operation of the countercurrent batch extraction process was carried out by the following cycle of operations for the five tanks:

*Tank 1.*—This tank received the spent sludge from tank two and fresh ammonia extraction solution, and the two were thoroughly agitated and then allowed to settle for about twenty-four hours.

*Tank 2.*—This tank received the sludge from tank number three and supernatant liquor from tank number one. The two were thoroughly agitated and then allowed to settle for twenty-four hours. The supernatant liquor was then pumped into tank number three and the sludge transferred to tank number one.

*Tank 3.*—This tank received the sludge from tank number four and supernatant liquor from tank number two. The two were thoroughly agitated and then allowed to settle for twenty-four hours. The supernatant liquor was then pumped into tank number four and the sludge transferred to tank number two.

*Tank 4.*—This tank received the sludge from tank number five and the supernatant liquor from tank number three. The two were thoroughly agitated and then allowed to settle for twenty-four hours. The supernatant liquor was then pumped into tank number five and the sludge transferred to tank number three.

*Tank 5.*—The original dry soybean flour to be extracted was added to this tank in proper amount and treated with the supernatant liquor which was withdrawn from tank number four. The two were thoroughly agitated and then allowed to settle for about twenty-four hours and the supernatant liquor then pumped out, passed through the centrifuge and then passed on to the spray drier. The cycles in all of the tanks can, of course, be repeated indefinitely for a continuous process.

The concentrated liquid, which in this instance contained thirteen per cent solids, was spray dried, using a nozzle pressure of 2500 pounds and a temperature in the drying chamber of about 175° F. The temperature may permissibly be varied over a considerable range, e. g. 160° F. to 220° F. and the pressure may likewise be varied within wide limits. The product was a very fine cream-colored flour free from any odor of ammonia being a dry adhesive base of wide utility for a variety of uses. This product, thus is in reality an oilseed flour free from crude fiber, since the crude fiber is substantially the only component which has been removed. This product had the following typical analysis and properties:

| | Per cent |
|---|---|
| Moisture | 4.06 |
| Fat (benzene-acetone soluble) | 2.79 |
| Fat (petroleum ether soluble) | 0.34 |
| Nitrogen calculated as protein___ 59.72 | |
| Less correction for combined ammonia___ 2.62 | |
| Net protein content | 57.10 |
| Crude fiber (cellulosic fibrous material) | Absent |
| Starch | Do |
| Soluble sugars, gums and hemicellulose (by difference, the difference obtained by subtracting from 100% the sum of the elements determined by analysis) | 35.71 |
| | 100.00 |

The pH of a water solution of the final dry product is non-alkaline being about pH 5.55. Also, the material is completely soluble to a colloidal solution in a cold dilute aqueous ammonia. The product also has the unusual property of being nearly completely soluble in water alone and at room temperature. Quantitatively, it is noted that the effect of the processing is confined to the elimination of the insoluble crude fiber and a corresponding increase in the protein content in the recovered solids of about thirty-three per cent, with evidence that the protein is now present in the form of an ammoniate or ammonia salt of protein. The amount of ammonia ($NH_4OH$) required to substantially completely extract the soluble components in a reasonably short time is greatly in excess of the amount required to convert the protein into an ammonia salt or ammoniate. Hence, only a small part of the ammonia remains in combination and being in combination the pH of the extracted product is not made alkaline thereby as is demonstrated by the pH of 5.55 which is well on the acid side. The yield of adhesive base obtained was in this instance about 75 per cent of the weight of the original meal treated.

The qualitative differences between this product and previous commercial adhesive base materials are very striking. As compared to the source material the properties of the product are found to be altered far more than would be expected from the mere removal of crude fiber. This is well illustrated by the following table showing the amount of water which must be added to 100 parts of various adhesives under several conditions of alkalinity to obtain a viscosity of 40 (MacMichael viscosimeter with #26 wire 1 cm. bob immersed 3 cm. at 20 R. P. M.) Viscosities were taken 30 minutes after the addition of the alkali. The materials compared are:

(1) The product of Example 1,
(2) Soybean flour made from the same meal as Example 1,
(3) A commercial extracted acid precipitated soybean protein, and
(4) Casein.

*Cubic centimeters of water to obtain 40 (MacMichael) viscosity required per 100 grams dry material*

|   |   | Water only | 6% NaOH | 9% NaOH | Ammonia equivalent to 5% NaOH | Ammonia equivalent to 7½% NaOH |
|---|---|---|---|---|---|---|
| 1 | Product of Example 1 | 117 | 292 | 292 | 116 | 116 |
| 2 | #200 mesh soybean flour | *304 | *398 | *358 | *304 | *300 |
| 3 | Acid precipitated soybean protein | ** | 402 | 355 | *486 | *489 |
| 4 | Casein | x | 200 | 184 | 524 | 508 |

*These all showed evidence of being incompletely dissolved when examined after further dilution.
**These merely swell in water. No viscosity readings were obtainable.

Several striking features are brought out in the above comparison. In regard to solubility in aqueous media, it is noted that the product of Example 1 has an extraordinary ability to make a thin dispersion with a small amount of water when the dispersing agent is either water alone or ammonia, while with caustic soda as the dispersing agent, it much more nearly resembles casein in that property than do the other materials. It is particularly to be noted that our new product derived from soybean flour has been freed from the objectionably high water requirement defect and likewise from the brush-mark forming elements.

The low water requirement and high solubility in ammonia indicate unmistakably that the protein in the product of Example 1 is in a practically undenatured condition. Further evidence of this is in the behavior when mixed with water. This material can then be readily whipped up into a stiff foam with an egg beater, the foam being similar in character to the froth obtained by beating up egg albumen. Relative ability to whip into a froth is one of the common tests for freedom from denatured character in a soybean protein.

Another important feature is found in the absence of brush-mark forming elements. Very dilute aqueous solutions of the product of Example 1, both in ammonia and caustic soda were made up and examined microscopically. No evidences of fibrous or cellular structures were found and the material appeared free from any elements which could cause brush-marks on coated paper. This feature was borne out by experience with the behavior of an actual coating mix as illustrated by the following example.

EXAMPLE 2.—PAPERCOATING MIXTURE 150 grams of china clay (or any other clay or filler which does not adversely affect the pH of the coating mixture) were thoroughly mixed with 100 cc. of water and allowed to stand overnight until a smooth clay slip was formed.

22.5 grams of the dry product of Example 1 were dissolved in an equal weight of water to which mixture 2 grams of concentrated aqua ammonia were added followed by the clay slip. 67.5 grams of additional water were then mixed in. The product was a smooth coating mix of good working properties, which spread without brush-marks and produced a coated paper which calendered to a good gloss and had good printing properties.

In comparison with a coating mix using casein as the adhesive, the performance obtained in this example indicates that the present product is capable of substituting for casein in approximately the proportion of eight parts of the present material to seven of casein. In view of the fact that the protein content of the casein is eighty-five per cent and of the present product only fifty-seven per cent, the material is surprisingly effective indicating both that the constituent protein is in a very undenatured and hence effective condition, and also that the nonprotein elements instead of being detrimental as generally supposed, actually contribute considerably to adhesive properties.

In explanation of the above, it is to be noted that besides the mere gluing action to hold the coating on the paper, an essential function of the adhesive in a coating mix is to act as a protective colloid to facilitate proper distribution of the ultimate particles of the clay in relation to each other, to the adhesive, and to the paper. The original papercoating adhesive was animal glue which exhibits these protective colloid effects as well as the gluing effect in marked degree. For instance, we found that if 150 parts of clay were suspended in 210 parts of water without reagents in a beaker, a certain rather thick, not very fluid consistency resulted with a tendency for the clay to quickly settle out from the water. Upon placing a similar mixture in a second beaker, but with 15 parts of animal glue previously dissolved in the water, a marked difference was evident in the consistency in that there was only a slight tendency for the clay to settle out. A similar mixture was prepared in a third beaker by adding 2 grams of aqua ammonia to the same amount of water along with twenty-two (22) parts of the spray dried product of Example 1 in place of the animal glue. A similar protective colloid effect was noted. The material was much thinner and more fluid than the mere mixture of water and clay in the first beaker and was similar in character to the adhesive in the second beaker; and there was also a great decrease in tendency for the clay to settle out.

The coating mix described in the foregoing example had this desirable character. It was of a smooth consistency and under the microscope the ultimate particles of the clay were seen to be well dispersed. The protective colloid effect of the adhesive was strongly in evidence as was shown by the ability of the coating to smooth out on the paper. Without this essential protective colloid effect, there would have been marked tendency for the ultimate particles of the clay to agglomerate or clot on the paper, thus preventing the formation of a smooth coating. There was also a complete absence of the objectionable fibrous fragments which seem to be the main cause of brush-marks when soybean flour is used as the adhesive in a coating mix. Of course, it will be understood that with the present adhesive, the same as with casein, it is necessary to have some alkalinity such as that obtained by the ammonia or an equivalent, in order to get the essential substantially complete state of dispersion. Although the present material is much more water-soluble than casein, the dispersion is still not complete enough for papercoating purposes without the presence of an alkali.

EXAMPLE 3.—PLYWOOD GLUE

A typical formula for a ready mixed casein dry glue base was modified by substituting an equal quantity of the product of Example 1 in place of the casein. No other change in the formula was made.

The following parts by weight were dry mixed:

| | |
|---|---|
| Product of Example 1 | 69.00 |
| Hydrated lime | 13.25 |
| Trisodium phosphate | 9.50 |
| Sodium fluoride | 7.25 |
| Pine oil | 1.00 |
| Total | 100.00 |

100 parts of the dry mixture were stirred for ten minutes in a glue mixer with 210 parts of water and then allowed to stand for thirty minutes. A smooth glue of good spreading consistency was obtained. Fir plywood made with this glue and then cold pressed gave dry shears of 282 pounds with seventy-eight per cent wood failure and a shear of 122 pounds per square inch after soaking specimens for forty-eight hours in cold water. This is first class commercial adhesion for fir plywood approximately equivalent to that obtained with the original casein formula.

In general, we find that this product may be substituted successfully for other adhesive bases in most of the common formulas for alkaline proteinous glues.

EXAMPLE 4.—PROTEINOUS ADHESIVE BASE FROM PEANUTS

Peanut meal residue after solvent extraction of the oil and having a 31% protein content was treated after the method of Example 1 except that the dried product was recovered by the use of a drum drier operated at 170° F. The temperature may range between about 150° F. and about 220° F. The dried product contained 71% protein and was similar in adhesive properties to the product of Example 1 making a smooth clay coating mix which spread for all practical purposes excepting very high glass papers, free from brush-marks and produced paper of good gloss and printing properties. As will be specially explained subsequently, spray drying of the product under critically controlled condition will eliminate any residual brush-marks whatever and is decidedly preferable. It was noted that the adhesive base was free from starch but there was a large amount of starch in the sludge. This removal of starch was partly responsible for the unexpectedly high protein content of the product.

EXAMPLE 5.—PROTEINOUS ADHESIVE BASE FROM WHEAT

A commercial wheat bread flour was treated according to the method of Example 1 and a liquor was obtained containing about seven per cent protein which was built up to eighteen per cent by a vacuum evaporation. The concentrate was then dried on the drum drier the same as the product of Example 4. The dried product had a protein content of 60.6%. The water requirement of this product was also low and it showed an undenatured character with good adhesive properties. The sludge rejected in the extraction was largely starch.

The general method of extraction as illustrated by Example 1 is a very flexible system capable of wide variation to suit particular conditions. The following are some of the variations:

1. *Concentration of solids*

As in any countercurrent extraction process, the concentration of solids increases as the extraction is continued, and ultimately a point is reached above which the concentration cannot be increased without some special steps being taken. With soybean meal and the system operated exactly as described in Example 1, the maximum concentration usually runs between 13 and 15 per cent. At this point settling becomes objectionably slow and ineffective. If, for any reason, it is desired to build the concentration to a higher point, that may be accomplished without danger of denaturing by vacuum evaporation. The solids may thus be built up to fifty per cent or even higher, if desired, in which case, provided a preservative such as pine oil is present, the material may be stored in the wet state and used directly as an adhesive base without any drying. Such a wet concentrate is equally effective as an adhesive base for papercoating or gluing and has the same undenatured characteristic and adhesive properties as the spray dried material. However, this method adds the cost of a processing step and is not ordinarily necessary and it does not have the advantage of reducing the amount of water in the system or eliminate the cost of shipping a bulky aqueous product.

For most purposes a more desirable method of building up a high concentration is by the use of a thinning agent. In the preliminary description of prior attempts to adapt soybean flour for direct use as a papercoating adhesive (page 1, lines 21 to 25), it was mentioned that various thinning agents and flow promoting agents had been tried as additions to the wet coating mix, but that these had not been successful in eliminating brush-marks. We find, however, that thinning agents are very useful in many instances in the present extraction or digesting process, since they greatly reduce the water required and facilitate obtaining concentrates of high solid content.

It is noted that Example 1 calls for the addition of ten parts of water to one of soybean flour. We have found that, if small percentages of various thinning agents are added in addition to the usual amount of mild alkali, it is possible to operate the system with much less water, producing a more concentrated product, eliminating the cost of drying out the extra water and we also find that under most conditions these thinning agents have no objectionable effect on the product. Suitable thinning agents are: soluble sulfites, particularly zinc sulfite, ammonium sulfite, and sodium sulfite; zinc sulfite being the most effective and ammonium sulfite being almost as effective. The zinc sulfite may be readily made by reacting sodium sulfite with zinc chloride. In the case of zinc sulfite or ammonium sulfite, we add to the extraction liquid about 1½ pounds for each 100 pounds of flour. With such addition, the system can be satisfactorily operated with the water ratio reduced from ten to one down to six or seven to one and in some cases even as low as four to one. By the use of these thinning agents, the operation of the counter-current extraction or digestion system may be so modified that a final wet product having a concentration as high as 25% solids can be directly produced, but to obtain maximum advantage of the effectiveness of the thinning agent in such instances, the additions of material to be extracted to the last tanks must be successively reduced as the concentration of the liquor is increased.

2. Urea as an ammonia equivalent

In some instances, particularly when treating soybean meal, an economy can be effected by obtaining the ammonia indirectly by adding urea instead of aqua ammonia. This is because the soybean contains a large amount of urease, an enzyme which very quickly breaks down urea so as to provide large quantities of ammonia. This enzyme is so exceedingly active and effective for this purpose that when treating other seed materials which contain no urease, an economy is sometimes possible by adding five to twenty per cent of soybean meal to provide a source of urease, in which case urea can be substituted for liquid ammonia. In most localities aqua ammonia is the cheaper material, but urea can be substituted in the treatment of soybean material whenever it is the cheaper source of ammonia. Gaseous ammonia and ammonia obtained by double decomposition or hydrolysis can also be used.

3. Modifications of extraction process

Example 1 described the counter-current system operated with only five tanks. In some instances it may be desirable to use less or more tanks. For example, using about eight to ten tanks it is possible to operate the counter-current system with additions of ammonia in the middle of the series of tanks instead of mostly at one end so that washings of the material with water along are facilitated in the tanks preceding the one where the ammonia is added. By this means, if all but the last wash water is reused in the system, some further economy of alkali may be effected so that scarcely any of it is lost with the sludge. The process may also be operated by digesting in a single tank and then removing the sludge by centrifuging. This, however, involves inefficiency due both to low concentration and incomplete extraction.

By a modification of the countercurrent system, it is possible to combine the ammonia extraction treatment with a previous or succeeding treatment with another reagent for special purposes. For example, sugars are soluble in a low concentration of acetic acid, while protein is largely insoluble, therefore, if it is desired to eliminate sugars from the product, a counter-current extraction with acetic acid may first be carried out discarding the solution containing the sugars, whereupon the residue containing the protein but with sugar removed, can be treated with the ammonia in the countercurrent system. By this means materials of especially high protein content and having a variety of non-protein constituents can be produced. In general, the soluble elements capable of being extracted are the proteins, sugars, and soluble gums and hemicellulose fractions. As is well known, these have various distinctive and differing solubilities, and in certain instances it is feasible to preliminarily selectively extract or remove one or more of these elements so as to obtain an adhesive base of modified character and special utility. Various possibilities of such selective treatment will be apparent to anyone skilled in the art.

4. Application to other proteinous seeds

Our process is broadly applicable to proteinous seeds in general; for instance, we have obtained similar proteinous adhesives from tungnut, cottonseed, and rye flour. In such instances the differences in properties were the expected differences derived from the source material, but the common feature of obtaining an exceptionally undenatured product of ready solubility in water or a mildly alkaline medium was present. In connection with starchy seed materials, it was noted in Example 4 that the sludge from the peanuts contained starch while the product was substantially free from starch. The same characteristic was noted in Example 5 when working with wheat flour which is a very starchy material relatively low in protein. The same feature was present when rye flour was extracted. We find that this elimination of starch is a desirable feature attending the use of ammonia as the extracting agent, because ammonia has practically no dissolving effect upon starch. Thus, the present process using ammonia offers an advantageous means for obtaining a high protein content product from very starchy materials. In such cases the sludge, being almost entirely starch, after drying may become the main valuable product of the process and the proteinous adhesive base, although also valuable material, is to be regarded as a by-product in view of its relatively small yield.

5. Omission of the centrifuging step

The use of a centrifuge to complete the clarifying of the liquor for the extraction process as a preliminary to drying is optional. If soybean material, for instance, is being extracted to make a papercoating adhesive, then the centrifuge should be used, as otherwise enough insoluble material may pass into the product to cause trouble with brush-marks. If, however, a glue base for plywood glues is being produced, as in Example 3, a simple settling step will remove most of the insolubles and the centrifuging step may be omitted as such a complete elimination of insolubles is not necessary to obtain an adhesive of good properties for that purpose.

6. Drying procedure

For most purposes, especially for papercoating, we prefer to dry the product in a spray drier having a high pressure nozzle system for forming the spray. We find that the intense mechanical action of the nozzle is advantageous and apparently breaks up and destroys any extremely minute fragments of undissolved material which escape even the centrifuge and would cause traces of brush-marks in papercoating. We have found that the spray dried product from a drier of this character produces perfectly smooth coatings while the same product dried on a drum drier often shows traces of brush-marks. Such was the case in the product of Example 4. We, therefore, prefer to use the high pressure nozzle spray drier because of the exceptionally high quality of product obtained. Where a papercoating adhesive is not being made, other types of spray driers and also drum driers may be used, it being important, as we have discovered, to operate at low temperature so as to avoid denaturing. In some cases it is advantageous and economical to use the direct fired type of spray drier where the drying agent is the hot combustion gases from a gas or oil flame.

In regard to drying temperature we have found that when operating with a spray drier, owing to the fact that spray drying is practically instantaneous, temperatures from approximately 150° F. to above 220° F. may be used without appreciable denaturing provided the drier is equipped for prompt discharge and cooling of the product. With a drum drier, in general, the temperature must be lower, this being particularly the case if a relatively thick film is fed onto the surface of the drum. In general, with drum driers, we find that denaturing is apt to occur if the temperature appreciably exceeds 170° F., but by sacrificing output by reducing the thickness of the film fed onto the drum, it is possible to use somewhat higher temperatures.

7. Ammonia content of dried product

We have found that our dried product although free from any ammoniacal odor, upon analysis gives slightly higher nitrogen than could be accounted for by the protein content alone. This is believed to be due to the formation of an additive compound between the ammonia and the protein which is stable enough to retain the ammonia in combination during the drying. It is probable that this also explains the unusual solubility in water alone, of the dried product. This would be analogous to the increase in solubility in water alone which occurs when casein has been treated with dry ammonia gas. Even though the casein so treated is exposed to the air for a long time and shows no odor of ammonia, it is nevertheless found to be very much more soluble in water without reagents than the untreated casein. Since the pH of a 10% aqueous solution of the dried soybean material produced by the method of Example 1 is about 5.55, it is apparent that any ammonia present must be in a combined state, otherwise the pH would be on the alkaline rather than the acid side. We have found that this high degree of solubility of the dried ammonia extracted soybean product in water alone, is a feature of considerable commercial value as the material has been found to produce very satisfactory effects in sizing textiles and the like without need for using any alkali at all in making up the sizing solution. It is thus possible to obtain a desirable sizing effect in a solution that is free from reagents which might prove detrimental to delicate threads or fabrics, a particularly desirable feature being that the size is non-alkaline.

8. Production of blended proteinous adhesives

Since most proteins, both vegetable and animal, are retained in solution in an ammoniacal solution such as either our digesting solution or the clarified solution used in our process, it is accordingly possible to make blended adhesives by such additions and such blended adhesives may be produced either in wet or dry form according to whether the mixture is used in the wet form or passed through our drying process. It will be seen that this feature enables us to produce adhesives having a very great range of properties, all of which are under control. Thus, for example, the high adhesive strength and special properties of such materials as animal glue and casein, or the marked thermosetting property of blood albumen, may be combined with the good general properties and cheapness of our new soybean adhesive and the properties of the cheap material are enhanced and improved by the addition. We have found all of these combinations valuable for meeting special requirements. The high solubility of the blended product is retained after low temperature drying. The ultimate dried particles of product obtained by this method of blending proteinous materials of different source and character, are thus seen to have a new unitary nature which is the result of the blending being carried out while the elements were in solution. This is a characteristic which distinguishes from a blend of particles of different materials simply mixed together. Such an intimate blend as we produce has a new characteristic of homogeneity since the particles are all of the same kind and identifiable as different from particles of any of the parent materials.

Other modes of applying the principle of the invention may be employed instead of these herein explained, changes being made as regards the details disclosed, provided the features stated in any of the following claims, or the equivalent of such, be employed.

We claim:

1. A process of making a dry proteinous adhesive base by digesting soybean meal in a cold ammoniacal solution having a pH of not less than 9.0 or more than 11.25, which comprises treating fresh soybean meal by agitating with ammoniacal solution in a tank, separating the residue of the meal from the liquid, treating the residue in a second tank containing fresh ammoniacal solution and separating the residue from the liquid, the ammoniacal solution used in the first tank having been previously used in the second tank, and thereafter spray-drying the solution through a pressure nozzle to obtain a dried product.

2. A process of making a dry proteinous adhesive base by digesting seed meal in a cold ammoniacal solution having a pH of not less than 9.0 or more than 11.25, which comprises treating fresh seed meal by agitating with ammoniacal solution in a tank, separating the residue of the meal from the liquid, treating the residue in a second tank containing fresh ammoniacal solution and separating the residue from the liquid, the ammoniacal solution used in the first tank having been previously used in the second tank, and thereafter spray-drying the solution through a pressure nozzle to obtain a dried product.

3. A process of making a dry proteinous adhesive base by digesting seed meal in a cold ammoniacal solution having a pH of not less than 9.0 or more than 11.25, which comprises treating fresh seed meal by agitating with ammoniacal solution in a tank, separating the residue of the meal from the liquid, treating the residue in a second tank containing fresh ammoniacal solution and separating the residue from the liquid, the ammoniacal solution used in the first tank having been previously used in the second tank, and thereafter recovering the solids from the solution by low temperature drying without precipitating the dissolved solids out of solution and without substantial loss of solubility.

4. A process of making a dry proteinous adhesive base by digesting soybean meal in a cold ammoniacal solution having a pH of not less than 9.0 or more than 11.25, which comprises treating fresh soybean meal by agitating with ammoniacal solution in a tank, separating the residue of the meal from the liquid, treating the residue in a second tank containing fresh ammoniacal solution and separating the residue from the liquid, the ammoniacal solution used in the first tank having been previously used in the second tank, and thereafter recovering the solids from the solution by low temperature drying without precipitating the dissolved solids out of solution and without substantial loss of solubility.

JOHN M. KNISELEY.
JEAN I. CAMPBELL.